United States Patent [19]
van der Lely et al.

[11] 4,292,819
[45] Oct. 6, 1981

[54] SHEAR PIN COUPLING

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 4,165

[22] Filed: Jan. 17, 1979

[30] Foreign Application Priority Data

Jan. 18, 1978 [NL] Netherlands ............. 7800577

[51] Int. Cl.³ .................... F16D 3/56; F16D 7/00
[52] U.S. Cl. .................... 64/28 R; 64/15 R; 64/15 C
[58] Field of Search ............. 64/28 R, 15

[56] References Cited
U.S. PATENT DOCUMENTS

| | | | |
|---|---|---|---|
| 1,740,617 | 12/1929 | Morgan | 64/28 R X |
| 1,740,838 | 12/1929 | Roesen | 64/28 R |
| 2,566,690 | 9/1951 | Wright | 64/28 R |
| 3,049,898 | 8/1962 | Voth | 64/28 R |
| 3,583,734 | 6/1971 | Magi | 64/28 R |
| 3,889,789 | 6/1975 | Boehringer | 64/28 R |
| 4,075,873 | 2/1978 | Geisthoff | 64/28 R X |
| 4,097,161 | 6/1978 | Weiss et al. | 64/28 R X |

*Primary Examiner*—Henry K. Artis
*Attorney, Agent, or Firm*—William B. Mason

[57] ABSTRACT

A shear pin coupling comprises two coupling parts which are normally interconnected by a shear pin. Upon overload, the shear pin fractures and the parts can rotated relative to one another. After fracture, the shear pin is advanced to re-interconnect the coupling parts by a spring-loaded plunger. The shear pin and the plunger are shaped to prevent displacement of the shear pin in a direction other than its lengthwise direction. The end of the pin may, for example, be conical for this purpose.

21 Claims, 2 Drawing Figures

4,292,819

SHEAR PIN COUPLING

This invention relates to a shear pin coupling.

With a known shear pin coupling, displacement of the remaining portion of the shear pin, after fracture, may occur in a direction at an angle to the lengthwise direction of the pin. Owing to this displacement, the shear pin cannot be advanced into the correct position for re-establishing the connection between the coupling parts.

According to a first aspect of the present invention there is provided a shear pin coupling comprising at least one shear pin which, in normal operation, connects a first coupling part with a second coupling part against relative displacement in at least one direction, guide means being provided for advancing the shear pin lengthwise, after fracture of the shear pin, into a position in which the shear pin re-establishes connection between the coupling parts, the guide means being shaped near one end region in such a way as to oppose movement of the shear pin in a direction other than the lengthwise direction of the shear pin.

The present invention also provides a shear pin for use in the coupling just defined.

According to a second aspect of the present invention there is provided a method of using a rotary shear pin coupling comprising two coupling parts which are interconnected in normal operation by a shear pin which fractures in the event of overload, the severed shear pin fragment being discharged from the coupling in a direction radial to the rotary axis of the coupling, whereafter the speed of one coupling part with respect to the other is reduced to allow the same or another shear pin to be advanced by guide means in its lengthwise direction into a new position in which the two coupling parts are again interconnected, the advancement of the pin, or one of the pins, occurring automatically after each overload until the guide means of the respective pin engages a stop to prevent further advancement of the pin.

For a better understanding of the present invention and to show how it may be carried into effect, reference will now be made, by way of example only, to the accompanying drawings, in which.

Figure 1:
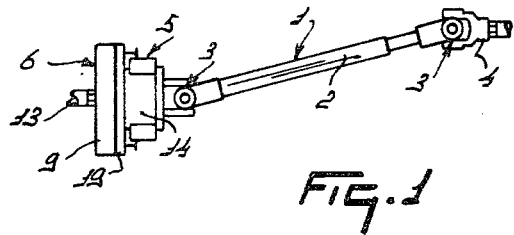
FIG. 1 shows a drive shaft assembly provided with a shear pin coupling.
Figure 2:
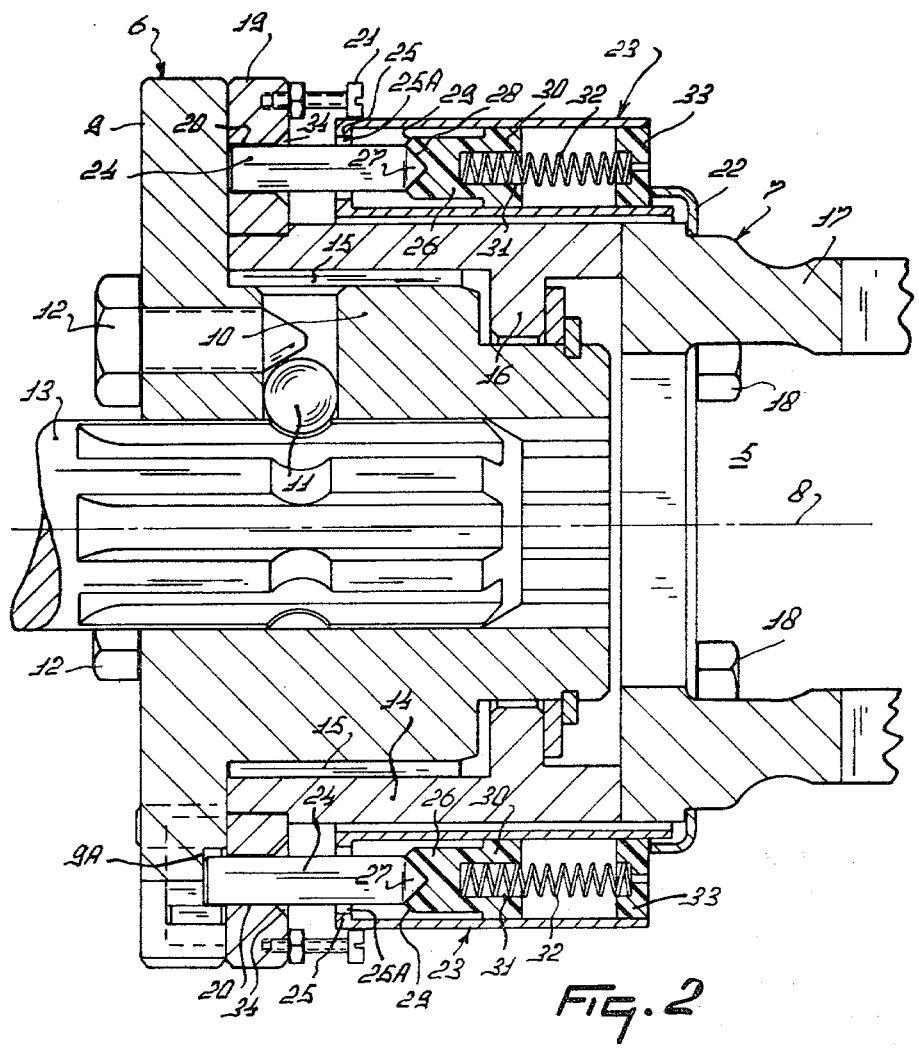
FIG. 2 is a sectional view of the shear pin coupling.

The drive shaft assembly 1 of FIG. 1 comprises a central main part 2 connected by universal joints 3 with end parts 4 and 5 respectively. The end parts 4 and 5 are connected with a driving shaft (for example the power take-off shaft of a tractor) and with a driven shaft (for example, the input shaft of an agricultural implement) respectively. The end part 5 comprises a shear pin coupling having a first coupling part 6 and a second coupling part 7, which, in normal operation, rotate together about a rotary axis 8 (FIG. 2). The coupling part 6 comprises a radially extending flange 9 and a hub 10 provided with retaining means formed by a ball 11 and a screw 12 for firmly connecting the coupling part 6 axially on a stub shaft 13 of the driving or driven shaft respectively. The coupling part 7 comprises a carrier 14 and a fork 17 of the universal joint 3. The coupling part 7 is coaxial with the hub 10 and a needle bearing 15 is arranged between the carrier 14 and the hub 10. The carrier 14 comprises an inner ring 16, which is in engagement with a thrust ring which, with a retaining ring, retains the coupling part 7 axially with respect to the coupling part 6. Bolts 18 connect the carrier 14 with the fork 17, these bolts extending axially into a hard steel cutting ring 19 of the coupling part 7. On one side, the cutting ring 19 meets the flange 9 and it has a plurality of bores 20; in the embodiment shown there are ten bores. The cutting ring 19 also has two axially extending supporting bolts 21. The carrier 14 is connected near the fork 17 with a centering ring 22. The centering ring 22 and the supporting bolts 21 serve as fastening means for two holders or cassettes 23 each accommodating, in this embodiment, five shear pins 24. Each holder 23 is arcuate and is centered on the axis 8 and has at one end a plurality of apertures 25A, from which project the respective shear pins. In normal operation, one of the ten shear pins 24 projects into an aperture 9A in the flange 9, so to interconnect the two coupling parts for rotation together. The cylindrical shear pins 24 extend axially and at the end 27 away from the flange 9 they have a shape which matches a pin plunger 26 which serves as guide means for advancing the shear pin after overload into a new operative position. For this purpose the end 27 of each shear pin is conical, the vertex angle being preferably about 90°. Each pin plunger 26 has a correspondingly shaped cavity 28. Thus the shear pin and the pin plunger can fit one another at their contact surfaces. Near the shear pin the diameter of the pin plunger 26 is slightly greater than that of the shear pin, but the largest diameter of the cavity 28 substantially corresponds with the diameter of the shear pin 24. Adjacent the cavity 28 the pin plunger 26 has an annular contact surface 29, which is preferably substantially perpendicular to the conical surface of the shear pin. The contact surface 29 meets the outer circumference of the pin plunger 26, which has a shoulder 30, axially behind the surface 29, which engages the inner surface of the holder 23 so as to form a centering ring for the pin plunger 26 in the holder 23. The pin plunger 26 has a cylindrical bore 31 accommodating one end of a compression spring 32, the other end of which is in contact with a cover 33 of the holder. The spring 32 presses the pin 24 against the flange 9, and presses the holder 23 with the cover 33 against the centering plate 22. The diameter of the opening 25A is chosen so that the portion of the pin plunger 26 which contacts the pin can move out of the holder 23. In order to bridge the distance between the end 25 of the holder 23 and the cutting ring 19 the axial diameter of the pin plunger 26 is chosen so that the end of the pin plunger can project far enough for the contact face 29 to come into co-operating contact with a correspondingly shaped contact face 34 located around the opening 20. The contact face 34 thus serves as a stop for the movement of the pin plunger 26.

In operation, the shear pin coupling provides protection against overload. Upon overload, the shear pin 24 interconnecting the coupling parts 6 and 7 will break, and the coupling parts 6 and 7 will then rotate relatively to one another. The tangential magnitude of the opening 9A is chosen so that the spring 32 can push the same or another one of the shear pins into the opening 9A again only when the speed of the drive has been reduced intentionally. To achieve this movement, each pin plunger 26 should guide the associated shear pin in its correct position, that is with the longitudinal axis of the shear pin parallel to the rotary axis 8. In particular, when the shear pin breaks, the remaining portion of the pin might move in a direction approximately transverse of its lengthwise direction, but this is prevented by the shape of the end of the shear pin and of the associated cavity of the pin plunger. Even after repeated breaks, the pin plunger is capable of guiding the shear pin in the manner described above to project from the holder 23. Between the holder 23 and the cutting ring 19 some axial gap is required owing to the disposition of the holder between the centering plate 22 and the supporting bolt 21. In this region between the holder and the cutting ring there is a risk for the remaining portion of the shear pin to move sideways in an undesirable manner. With the described method of guiding, the end of the shear pin is guided into direct proximity with the opening 20 so that the shear pin can be used substantially throughout its whole length without risk of damage of the pin plunger 26.

The coupling described is intended for use with 8 mm diameter pins. If desired, the cutting ring 19 can be replaced (the openings 20 being adapted to the size of the shear pins) and by using holders 23 with, for example, 9 mm diameter pins the coupling may be rendered suitable for transmitting a higher maximum torque. With this larger size the contact surfaces desribed above are very advantageous. The described construction of the pin plunger 26 is particularly suitable for all conventional pin diameters. If desired, the shapes of the shear pin 24 and of the pin plunger 26 may be inverted, the shear pin then having the cavity. The guide means described may also be used in other couplings than the shear pin coupling described, for example, in a stationary coupling.

While various features of the coupling that have been described, and that are illustrated in the drawings, will be set forth in the following claims as inventive features, it is to be noted that the invention is not necessarily limited to these features and that it encompasses all of the features that have been described both individually and in various combinations.

We claim:

1. A shear pin coupling comprising a first coupling part connected to a second coupling part through a shear pin that prevents relative displacement between the two parts in at least one direction, said pin having a longitudinal axis and guide means urging the pin in a direction generally parallel to said axis to establish an operative connection between said two parts, said pin being fractured upon overload to permit relative movement between the parts in said one direction and the remainder of said pin being urged in the pin's axial direction by said guide means to re-establish said operative connection between the two parts, an end portion of said guide means cooperating with said pin to oppose non axial movements of the pin.

2. A shear pin coupling as claimed in claim 1, in which said guide means comprises a pin plunger having a cavity in said portion and said portion bearing on the pin.

3. A shear pin coupling as claimed in claim 2, in which the contact surfaces of said pin and of said plunger have co-operating configurations.

4. A shear pin coupling as claimed in claim 3, in which the end of said pin portion engages the pin and said end is conical.

5. A shear pin coupling as claimed in claim 4, in which the vertex angle of the conical end is about 90°.

6. A shear pin coupling as claimed in claim 4, in which the diameter of said plunger is greater than that of said pin.

7. A shear pin coupling as claimed in claim 6, in which the largest diameter of said cavity is approximately equal to the diameter of said pin.

8. A shear pin coupling as claimed in claim 6, in which there is an annular contact face on said plunger adjacent said cavity.

9. A shear pin coupling as claimed in claim 8, in which said annular contact face is substantially perpendicular to the first mentioned contact surface of said plunger and the latter surface engages the end of said pin.

10. A shear pin coupling as claimed in claim 9, in which the annular contact face is located between the outer circumference of said plunger and the cavity therein 11. A shear pin coupling as claimed in claim 10, in which said annular contact face co-operates with a correspondingly shaped face of one of the coupling parts and said pin is supported on that one part.

12. A shear pin coupling as claimed in claim 11, in which the shaped face of said one coupling part surrounds a bore into which said pin extends.

13. A shear pin coupling as claimed in claim 12, in which the shaped face limits movement of the plunger in the direction towards the operative connection between the two parts.

14. A shear pin coupling as claimed in claim 13, in which the shaped face forms the periphery on the bore in said one part.

15. A shear pin coupling as claimed in claim 13, in which said shaped face and the bore are provided in a hard steel cutting ring of said one part and said ring is positioned for exerting a cutting action on the shear pin.

16. A shear pin coupling as claimed in claim 15, in which said pin is housed at least partly within a holder, and said holder has an opening through which said pin projects, the size of said opening being enlarged and allowing said plunger portion to emerge from the holder through said opening.

17. A shear pin coupling as claimed in claim 16, in which the length of said plunger at least equals the distance between said holder and said ring.

18. A shear pin coupling as claimed in claim 1, in which said parts rotate in normal operation about a common rotary axis and the guide means opposes movements of said pin in tangential and radial directions.

19. An elongated, multiple shear pin for use in a coupling comprising a first coupling part connected to a second coupling part, said shear pin being positionable to prevent relative displacement between the two parts in at least one direction, said pin having a longitudinal axis and being slideable in a direction generally parallel to said axis to establish an operative connection between said two parts, said pin being fracturable upon overload to permit relative movement between the parts in said one direction and comprising contact end portion means engageable by guide means for automatic repositionment to re-establish an operative connection between said two parts, said contact end portion means of said pin being shaped to cooperate with said guide means and avoid non-axial movements.

20. A shear pin as claimed in claim 19, wherein said shaped contact surface is conical to interfit with a cavity of said guide means.

21. A method of re-establishing a rotary shear pin coupling between two coupling parts which are interconnected in normal operation by an elongated shear pin which fractures in the event of overload, comprising discharging the severed shear pin fragment from the coupling in a direction radial to the rotary axis thereof, reducing the speed of one coupling part relative to the other, automatically guiding the remainder of the shear pin in its lengthwise direction into a new position in which the two coupling parts are again interconnected, repeating the advancement of the pin by a guide following each fracture and discharge unitl the guide engages a stop and is prevented from advancing the pin.

* * * * *